F. F. CLARKE.
MEANS FOR DELIVERING CUTTING COMPOUND TO THE TOOLS OF VERTICAL BORING AND TURNING MILLS.
APPLICATION FILED AUG. 18, 1919.

1,425,943.

Patented Aug. 15, 1922.
2 SHEETS—SHEET 1.

INVENTOR.
FREDERICK F. CLARKE
BY Edward R. Inman
ATTORNEY

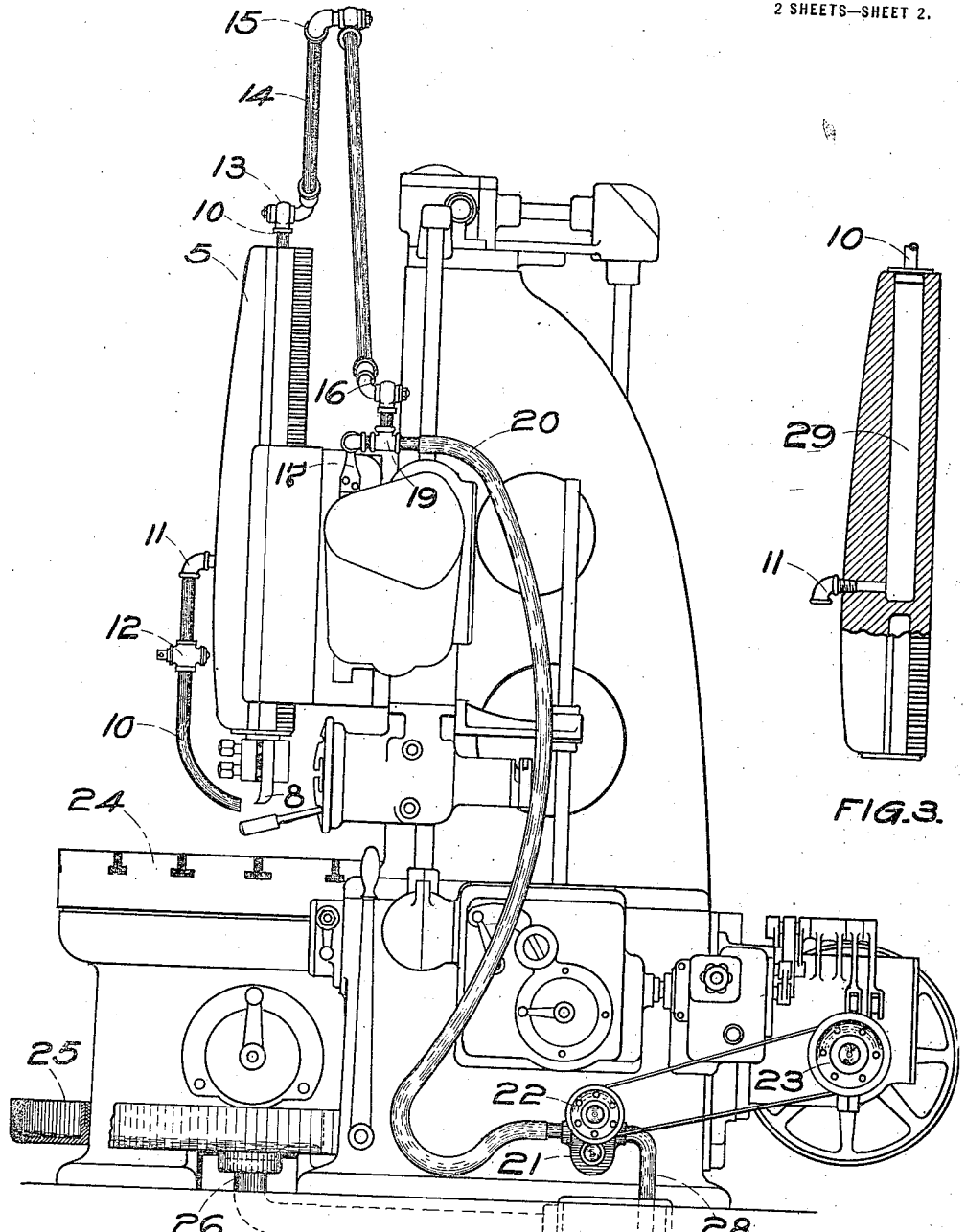

UNITED STATES PATENT OFFICE.

FREDERICK F. CLARKE, OF FRANKLIN, PENNSYLVANIA, ASSIGNOR TO THE COLBURN MACHINE TOOL COMPANY, OF CLEVELAND, OHIO, A CORPORATION OF OHIO.

MEANS FOR DELIVERING CUTTING COMPOUND TO THE TOOLS OF VERTICAL BORING AND TURNING MILLS.

1,425,943.

Specification of Letters Patent. Patented Aug. 15, 1922.

Application filed August 18, 1919. Serial No. 318,150.

*To all whom it may concern:*

Be it known that I, FREDERICK F. CLARKE, a citizen of the United States, residing at Franklin, in the county of Venango and State of Pennsylvania, have invented certain new and useful Improvements in Means for Delivering Cutting Compound to the Tools of Vertical Boring and Turning Mills, of which the following is a specification.

The object, construction and use of this invention are herein set forth with sufficient clearness to enable those skilled in the construction and operation of machine tools, especially, vertical boring and turning mills, to make and use the same.

The object of this invention is, to provide means for the delivery of cutting compound to the tools of a boring mill or to the work adjacent to said tools and to so connect the same to the tool-carrying element that the delivery pipe or nozzle will automatically follow the movement or travel of the tool in either vertical, horizontal or intermediate directions in which it may be feed-actuated, and will thereby dispense with the necessity of manually adjusting and re-adjusting said nozzle, relative to the travel of the tools, as the work proceeds.

A further object of this invention is, to equip the ram of a vertical boring and turning mill with a fluid delivery means, in such a way that it will not interfere with free access to the work-carrying table, or require that said delivery means be moved out of the way for the purpose of placing work upon the table, or removing it therefrom.

One form of construction whereby I am able to attain said object is clearly illustrated in the accompanying drawings, the figures of which are as follows:

Fig. 2 is a side elevation of a vertical boring and turning mill equipped with my improved means of delivering cutting compound to the tools.

Fig. 3 shows a modified method of connecting the delivery conduit to the ram of the mill.

Figure 1:
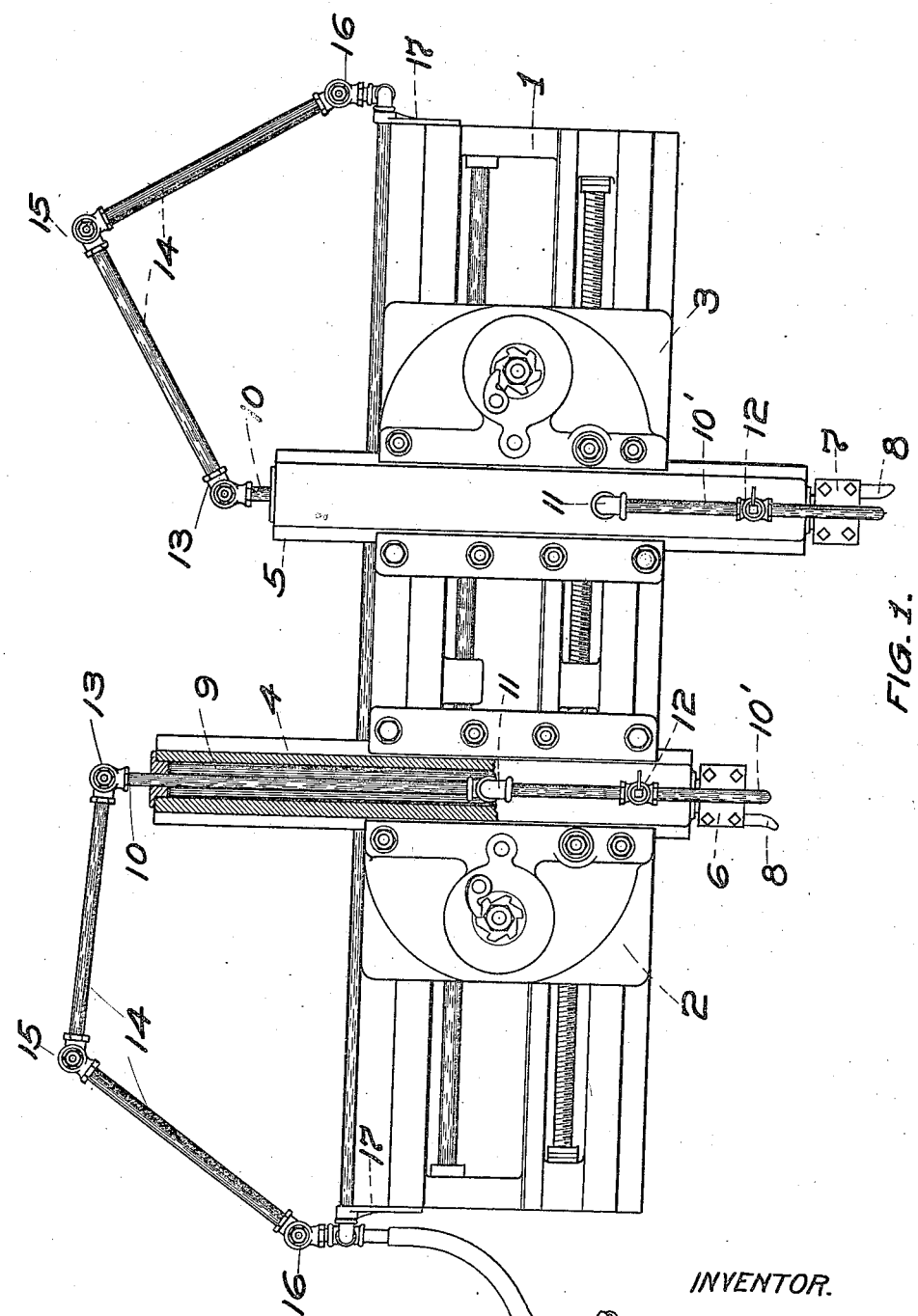
Fig. 1 is a front elevation of the cross-rail of a boring mill equipped with two saddles, each of which carries a ram of substantially the usual construction.

It should be understood that these drawings are illustrative merely, and show one way in which my invention may be practically embodied. Furthermore, it is pointed out that, while Fig. 1 shows two rams commonly so called, also referred to as tool-slides, this is only because the drawings illustrate a common construction in boring mill practice and one to which my invention has been applied, but my inventive idea is as completely expressed in its application to one ram as it is when applied to two rams. As usual the precise definition and scope of my invention must be found in the appended claims.

The construction illustrated in said drawings is as follows:

The cross-rail of a vertical boring and turning mill 1 is equipped with two saddles 2 and 3, which are mounted to move longitudinally upon said rail. In the respective saddles is mounted a vertically movable ram 4, 5, each of which is shown as carrying a tool holder 6, 7 respectively, the cutting tool being indicated by the reference numeral 8. In the construction of vertical boring and turning mill it is a common practice to equip the tool-slide with a turret adapted to carry several tools to be successively applied to the work, and my invention applies as readily to one form of such construction as to the other and includes both. Furthermore it is immaterial so far as the application of my invention is concerned whether the ram occupies a vertical position, or some position at an angle thereto.

In order to prevent an excessive generation of heat by the operation of the cutting-tools upon the work, it is necessary to flood the cutting edge of the tool and the area adjacent thereto with some of the various oils or other fluid compounds commonly used for this purpose, and my invention, which relates to an equipment whereby said cutting compound is delivered to the tools, will now be described.

As usually constructed, the ram of a boring mill is hollow, or provided with a core chamber 9, as shown in Fig. 1; within said chamber 9, is inserted a suitable pipe or conduit 10, the upper end of which projects above the top of the ram. At a suitable point said pipe 10 extends through the front wall of the ram, through a suitable opening which intersects chamber 9, and the projecting portion or nozzle 10 of said pipe has its lower delivery-end positioned in close proximity to the cutting tool 8. The connection 11 is such that the pipe 10 may be swung vertically or laterally as desired, and is provided with a suitable valve or stop 12, for regulating the flow of fluid through the pipe, and to shut off the same when desired. The upper end of pipe 10 is provided with a swing joint 13, to which, in turn, is connected a conduit having suitable flexibility as a pipe 14 provided with suitable swing joints, 15 and 16. The outer flexible point 16, or the pipe which carries the same, is connected to the end of the cross-rail 1, in any suitable manner, as by a bracket 17. It will be noticed that the swing joints 16, 16, are connected by means of a supply pipe 18, but this would not be used in a boring mill equipped with but one ram.

In Fig. 2, the swing joint 16, is shown as being carried by a T 19, to which is connected one end of a flexible conduit 20, the other end of which is connected to the outlet of a rotary or centrifugal pump 21; the driving pulley 22 of this pump is belted to a pulley 23, which is mounted upon the main driving shaft of the boring mill. The flexible conduit 20 permits the vertical travel of the cross-rail and the swing joints connecting the pipes 14 permit both a vertical and a lateral movement of the tool-slides 4 and 5.

When my invention here shown is employed, the hole in the spindle of the table 24 is plugged so that the fluid supplied through the nozzle 10 cannot escape therethrough, and a suitable channel 25 is provided upon the bed of the mill into which the cutting compound drains, and from which it flows through the pipe 26 to a well 27, and into which the intake pipe 28 of the pump 21 is inserted, and draws its supply of fluid.

In Fig. 3 I have shown a ram, in which a core-chamber 29 is utilized as a portion of the conduit for delivering fluid to the nozzle 10', thus dispensing with the section 10 of said conduit.

I am aware that it is not broadly new to supply means for delivering cutting compound to the tools of various machine tools, and it is not my intention to broadly claim my invention in connection with machine tools in general; but, so far as I am aware my invention as herein illustrated, described, and defined in the appended claims, provides a more facile, economical and efficient equipment of this kind than has heretofore been applied to a vertical boring and turning mill.

I claim the following:

1. Means for delivering cutting compound to the tools of vertical boring and turning mills comprising a tube carried in the tool-slide of the mill, a delivery tube adjacent the tool carried by the slide said delivery tube attached to the slide and communicating with the tube in the slide, a main delivery tube attached to the machine and a flexible tube connection between the tube in the tool slide and the main delivery tube.

2. Means for delivering cutting compound to the tools of vertical boring and turning mills comprising a slide for carrying the tool, a conduit in said slide for the compound, a delivery nozzle carried by said slide having communication with said conduit with its delivery end positioned adjacent said tool, and flexible tube connection for delivering the compound to the conduit in said slide.

3. Means for delivering cutting compound to the tools of vertical boring and turning mills comprising in combination, the tool slide of such mill provided with a conduit for the passage of the compound therethrough, a delivery nozzle carried by said slide in communication with said conduit positioned exteriorly to the tool with its delivery end adjacent the cutting point of said tool so as to deliver said compound thereto, and flexible tube connection arranged to deliver the compound to the conduit.

4. Means for delivering cutting compound to the tools of vertical boring and turning mills comprising in combination, the tool slide of such mill provided with a conduit for the passage of compound therethrough, a delivery nozzle carried by said slide in communication with said conduit, positioned outside the transverse plane of the tool with its delivery end adjacent the cutting point of said tool, and flexible tube connection arranged to deliver the compound to said conduit.

In testimony whereof I affix my signature in presence of two witnesses.

FREDERICK F. CLARKE.

Witnesses:
C. R. WILLIAMS,
G. W. HARTKE.